United States Patent
Hirano et al.

(10) Patent No.: US 11,179,799 B2
(45) Date of Patent: Nov. 23, 2021

(54) CLAMP MEMBER FOR DOUBLE-ACTING FRICTION STIR SPOT WELDING DEVICE, DOUBLE-ACTING FRICTION STIR SPOT WELDING DEVICE, AND DOUBLE-ACTING FRICTION STIR SPOT WELDING METHOD

(71) Applicant: KAWASAKI JUKOGYO KABUSHIKI KAISHA, Kobe (JP)

(72) Inventors: Masaaki Hirano, Kakamigahara (JP); Takashi Ninomiya, Kakamigahara (JP); Etsuko Yamada, Ichinomiya (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/810,868

(22) Filed: Mar. 6, 2020

(65) Prior Publication Data
US 2020/0206840 A1 Jul. 2, 2020

Related U.S. Application Data

(63) Continuation of application No. PCT/JP2018/032882, filed on Sep. 5, 2018.

(30) Foreign Application Priority Data

Sep. 8, 2017 (JP) .............................. JP2017-172968

(51) Int. Cl.
*B23K 20/12* (2006.01)
*B23K 20/26* (2006.01)

(52) U.S. Cl.
CPC .......... *B23K 20/126* (2013.01); *B23K 20/123* (2013.01); *B23K 20/125* (2013.01); *B23K 20/1265* (2013.01); *B23K 20/26* (2013.01)

(58) Field of Classification Search
CPC ............................................ B23K 20/122–128
USPC ............................... 228/112.1–114.5, 2.1–2.3
See application file for complete search history.

(56) References Cited

U.S. PATENT DOCUMENTS

| | | | |
|---|---|---|---|
| 7,416,102 B1 * | 8/2008 | Trapp ................. | B23K 20/1225 228/112.1 |
| 2007/0152015 A1 * | 7/2007 | Burton ................. | B23K 20/126 228/2.1 |
| 2007/0241163 A1 * | 10/2007 | Valant ................ | B23K 20/1255 228/2.1 |

(Continued)

FOREIGN PATENT DOCUMENTS

| | | |
|---|---|---|
| JP | 2012-196682 A | 10/2012 |
| JP | 2016-083669 A | 5/2016 |

*Primary Examiner* — Kiley S Stoner
(74) *Attorney, Agent, or Firm* — Xsensus LLP

(57) ABSTRACT

A clamp member, for a double-acting friction stir spot welding device, is provided for the double-acting friction stir spot welding device to perform friction stir spot welding of a workpiece by using a rotary tool, and presses a surface of the workpiece while the workpiece is supported. The rotary tool has a pin member and a shoulder member. The clamp member includes an end face that comes into surface contact with the surface of the workpiece to press the surface and a protruding portion protruding from the end face in an axial direction and extending around an axis. The protruding portion is configured to press the workpiece, the clamp member surrounding an outer periphery of the shoulder member.

14 Claims, 6 Drawing Sheets

(56) References Cited

U.S. PATENT DOCUMENTS

| | | | |
|---|---|---|---|
| 2008/0006677 A1* | 1/2008 | Kumagai | B23K 20/1265 228/101 |
| 2008/0029581 A1* | 2/2008 | Kumagai | B23K 20/1255 228/101 |
| 2009/0308913 A1* | 12/2009 | Hall | B23K 20/126 228/112.1 |
| 2010/0038832 A1* | 2/2010 | Rosal | B23K 20/1255 266/46 |
| 2010/0084456 A1* | 4/2010 | Carter | B23K 20/126 228/112.1 |
| 2012/0267419 A1* | 10/2012 | Blaski | B23K 20/126 228/2.1 |
| 2012/0279043 A1* | 11/2012 | Carter | B21D 39/031 29/525.05 |
| 2012/0279271 A1* | 11/2012 | Carter | H05B 6/101 72/342.8 |
| 2013/0134206 A1 | 5/2013 | Roos et al. | |
| 2014/0069986 A1 | 3/2014 | Okada et al. | |
| 2016/0332215 A1 | 11/2016 | Blacket et al. | |
| 2020/0101519 A1* | 4/2020 | Sun | B21J 15/025 |
| 2020/0276666 A1* | 9/2020 | Haruna | B23K 20/1255 |
| 2021/0053146 A1* | 2/2021 | Yapici | B23K 20/1245 |
| 2021/0086291 A1* | 3/2021 | Okada | B23K 20/1255 |

\* cited by examiner

CLAMP MEMBER FOR DOUBLE-ACTING FRICTION STIR SPOT WELDING DEVICE, DOUBLE-ACTING FRICTION STIR SPOT WELDING DEVICE, AND DOUBLE-ACTING FRICTION STIR SPOT WELDING METHOD

CROSS-REFERENCES TO RELATED APPLICATIONS

The present application is a bypass continuation of PCT Application No. PCT/JP2018/032882, filed Sep. 5, 2018, which claims priority to JP 2017-172968, filed Sep. 8, 2017, both of which are incorporated herein by reference.

TECHNICAL FIELD

The present application relates to a clamp member for a double-acting friction stir spot welding device, a double-acting friction stir spot welding device, and a double-acting friction stir spot welding method and, more particularly, to a technique of improving the fatigue strength of a joint portion formed by welding.

BACKGROUND ART

Conventionally, a double-acting friction stir spot welding device is provided with a pin member and a shoulder member that can rotate around a predetermined axis independently of each other and advance and retract in an axial direction. The double-action friction stir spot welding device is further provided with a clamp member that surrounds an outer periphery of the shoulder member to advance and retract in the axial direction. In welding a workpiece by friction stir spot welding, it is required to improve the fatigue strength of a joint portion formed by welding. However, simply performing a process for improving such fatigue strength may reduce a manufacturing efficiency of a welded body.

SUMMARY

In an exemplary implementation of the present application, a clamp member for a double-acting friction stir spot welding device is a clamp member that is provided for a double-acting friction stir spot welding device for performing friction stir spot welding of a workpiece by a rotary tool and presses a surface of the workpiece while the workpiece is supported. The rotary tool includes a pin member configured to rotate around a predetermined axis and advance and retract in an axial direction and a shoulder member configured to rotate around the axis while surrounding an outer periphery of the pin member and advance and retract in the axial direction independently of the pin member. The clamp member includes an end face that comes into surface contact with the surface of the workpiece to press the surface and a protruding portion protruding from the end face in the axial direction and extending around the axis, the protruding portion being configured to press the workpiece, the clamp member surrounding an outer periphery of the shoulder member.

The protruding portion of the clamp member protrudes from the end face of the clamp member in the axial direction and extends around the axis, and is configured to press the workpiece. Accordingly, after the workpiece is pressed with the clamp member and the workpiece is welded by friction stir spot welding using the pin member and the shoulder member of the rotary tool, the surface of at least one of the friction stir region of the workpiece and the adjacent region adjacent to the friction stir region can be pressed with the protruding portion of the clamp member.

The end face may be formed in an annular shape, and the protruding portion may be formed in an arc shape extending in a circumferential direction of the end face, when viewed in the axial direction.

The end face may be formed in an annular shape, and the protruding portion may be formed in an annular shape extending over the entire circumference of the end face, when viewed in the axial direction.

The protruding portion may be disposed closer to the axis than the outer edge of the end face.

In accordance with another exemplary implementation of the present application, a friction stir spot welding method for performing friction stir spot welding of a workpiece by using a rotary tool for friction stir spot welding of the workpiece and a clamp member for pressing a surface of the workpiece while the workpiece is supported. The rotary tool includes a pin member configured to rotate around a predetermined axis and advance and retract in an axial direction and a shoulder member configured to rotate around the axis while surrounding an outer periphery of the pin member and advance and retract in the axial direction independently of the pin member. The clamp member includes an end face that comes into surface contact with the surface of the workpiece to press the surface and a protruding portion protruding from the end face in the axial direction and extending around the axis, the protruding portion being configured to press the workpiece, the clamp member surrounding an outer periphery of the shoulder member. The friction stir spot welding method includes a welding step of performing friction stir spot welding of the workpiece while causing the pin member to backfill a plastic flow portion of the workpiece entering an inside of the shoulder member by friction stir using the shoulder member in a state in which the surface of the workpiece is pressed with the clamp member and a pressing step of causing the protruding portion of the clamp member to press a surface of at least one of a friction stir region of the workpiece and an adjacent region adjacent to the friction stir region of the workpiece after the welding step in a state in which the pin member and the shoulder member are separated from the workpiece.

The protruding portion of the clamp member protrudes from the end face of the clamp member in the axial direction and extends around the axis, and is configured to press the workpiece. Accordingly, after the welding step in which the workpiece is pressed with the clamp member and the workpiece is welded by friction stir welding using the pin member and the shoulder member of the rotary tool, the pressing step is performed in which the friction stir region of the workpiece and the adjacent region can be pressed with the protruding portion of the clamp member.

Further, such pressing of the workpiece in the pressing step can be performed using the clamp member. In addition, when friction stir spot welding is performed a plurality of times by a series of welding operations, such pressing operation can be performed between the respective welding operations.

In addition, by pressing the workpiece with the protruding portion that protrudes from the end face of the clamp member in the axial direction and extends around the axis, the workpiece can be properly compressed even with a relatively small pressing force.

In the welding step, friction stir spot welding may be performed in a state in which the protruding portion is positioned at a retraction position different from a pressing position where the protruding portion presses the surface of the workpiece in the pressing step. In the pressing step, the surface of the workpiece may be pressed with the protruding portion with the protruding portion moved from the retraction position to the pressing position.

DETAILED DESCRIPTION OF THE DRAWINGS

Each embodiment and each modification will be described below with reference to the accompanying drawings.

First Embodiment

Figure 1:
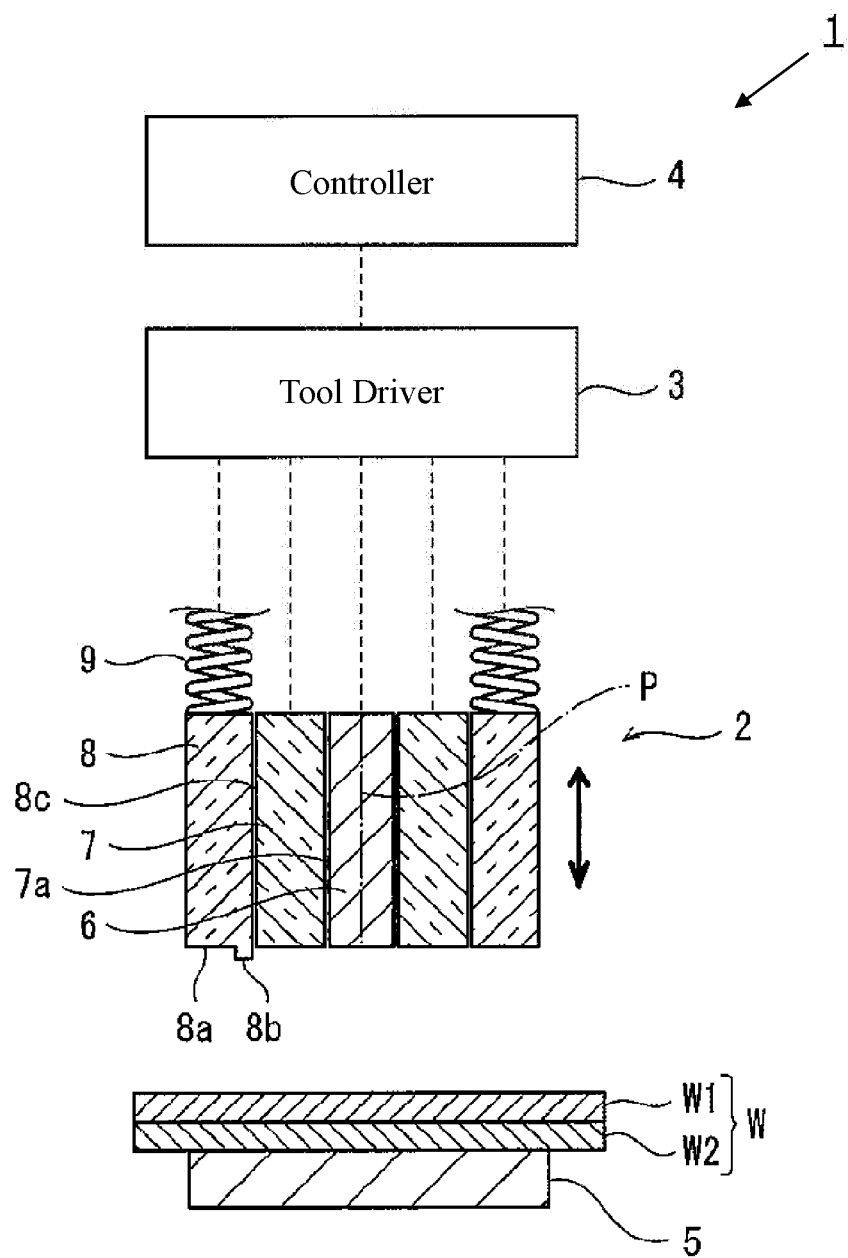
FIG. 1 illustrates a configuration of a main part of a double-acting friction stir spot welding device according to a first embodiment.

FIG. 1 shows a configuration of a main part of a double-acting friction stir spot welding device 1 (referred to as the device 1 hereinafter) according to the first embodiment. Referring to FIG. 1, a rotary tool 2 is shown in cross section, and a connection between the rotary tool 2 and a tool driver 3 is schematically indicated by broken lines.

The device 1 performs friction stir spot welding of workpieces W (for example, a pair of plate materials (a first plate material W1 and a second plate material W2)). The device 1 includes the rotary tool 2, the tool driver 3, a controller 4, a backing portion 5, and a clamp member 8.

The tool driver 3 moves the rotary tool 2 to a plurality of predetermined positions and drives the rotary tool 2 to rotate. The controller 4 controls the tool driver 3 so as to drive members 6 to 8 included in the rotary tool 2. The specific structure of the tool driver 3 is not limited, and for example, a known structure can be used.

The controller 4 is, for example, a computer including a CPU, a ROM, and a RAM, and controls the operation of the tool driver 3. A predetermined control program is stored in the ROM, and setting information input by an operator is stored in the RAM. The setting information includes, for example, information on each plate thickness value of the plate materials W1 and W2 and information on each welding position.

Moreover, the functionality of the controller 4 disclosed herein may be implemented using circuitry or processing circuitry which includes general purpose processors, special purpose processors, integrated circuits, ASICs ("Application Specific Integrated Circuits"), conventional circuitry, controllers, and/or combinations thereof which are configured or programmed to perform the disclosed functionality. Processors and controllers are considered processing circuitry or circuitry as they include transistors and other circuitry therein. In this disclosure, any circuitry, units, controllers, or means are hardware carry out or are programmed to perform the recited functionality. The hardware may be any hardware disclosed herein or otherwise known which is programmed or configured to carry out the recited functionality. When the hardware is a processor or controller which may be considered a type of circuitry, the circuitry, means, or units are a combination of hardware and software, the software being used to configure the hardware and/or processor.

The backing portion 5 is a support portion, and is disposed on an opposite side of the workpiece W to the rotary tool 2 to support the workpiece W. A part of the backing portion 5 faces the rotary tool 2 with the workpiece W interposed therebetween.

The rotary tool 2 includes a pin member 6 and a shoulder member 7. The rotary tool 2 has a nested structure in which the shoulder member 7 is disposed outside the pin member 6 and the clamp member 8 is disposed outside the shoulder member 7.

The pin member 6 is provided so as to rotate around a predetermined axis P and to advance and retract in the axis P direction. The pin member 6 of this embodiment is formed in a columnar shape extending in the axis P direction. The rear end portion of the pin member 6 in the axis P direction (the end portion of the pin member 6 which is located on the opposite side to the workpiece W) is supported by a fixing portion of the tool driver 3.

The shoulder member 7 is provided around the outer periphery of the pin member 6 so as to rotate around the axis P so as to be advance and retract in the axis P direction independently of the pin member 6. The shoulder member 7 has a hollow portion 7a, and the pin member 6 is inserted into the hollow portion 7a of the shoulder member 7. In the rotary tool 2 of this embodiment, the pin member 6 and the shoulder member 7 are provided so as to independently rotate around the axis P and advance and retract in the axis P direction while the pin member 6 is inserted into the hollow portion 7a of the shoulder member 7. The shoulder member 7 is formed in a columnar shape extending in the axis P direction.

The clamp member 8 is provided so as to surround the outer periphery of the shoulder member 7. The clamp member 8 is provided independently of the pin member 6 and the shoulder member 7 so as to be able to advance and retract in the axis P direction. The clamp member 8 has a hollow portion 8c, and the shoulder member 7 is inserted into the hollow portion 8c of the clamp member 8.

A spring 9 for applying a biasing force to the clamp member 8 toward the workpiece W in the axis P direction is disposed at the rear end portion of the clamp member 8 in the axis P direction The clamp member 8 presses the workpiece W supported by the backing portion 5 in the axis P direction by the urging force from the spring 9. When the clamp member 8 is retracted from the workpiece W, the clamp member 8 is pulled up by the tool driver 3 and retracted from the workpiece W.

Figure 2:
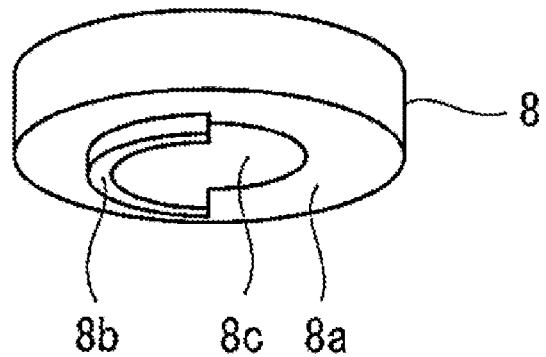
FIG. 2 illustrates a perspective view of a clamp member in FIG. 1 as viewed from the end face side.

FIG. 2 shows a perspective view of the clamp member 8 in FIG. 1 as viewed from an end face 8a side. As shown in FIGS. 1 and 2, the clamp member 8 has the end face 8a and a protruding portion 8b. The end face 8a is disposed to come into surface contact with the surface of the workpiece W (the plate surface of the first plate material W1 in this case) so as to press the surface of the workpiece W.

The protruding portion 8b protrudes in the axis P direction from the end face 8a. The protruding portion 8b is an indenter that presses the workpiece W that has been subjected to friction stir spot welding. The protruding portion 8b is disposed so as to be able to press the workpiece W that has been subjected to friction stir spot welding in the axis P direction.

The protruding portion 8b has a shape for applying compressive plastic strain to the welding interface, which is the load transmitting portion of the workpiece W, within the load output range of a normal friction stir spot welding device. Thus, the device 1 includes a compression processing mechanism for the workpiece W.

Specifically, a region other than the protruding portion 8b of the end face 8a is formed flat. The end face 8a of the clamp member 8 of this embodiment is formed in an annular shape when viewed in the axis P direction. The protruding portion 8b is formed in an arc shape extending in the circumferential direction of the end face 8a when viewed in the axis P direction. That is, the protruding portion 8b extends from end face 8a while being curved with a certain curvature as viewed in the axis P direction. For example, the width and height (in the direction of the axis P) of the protruding portion 8b are constant. Further, a cross section of the protruding portion 8b which is perpendicular to the longitudinal direction is rectangular.

In this embodiment, the peripheral edge shape of the hollow portion 8c is formed in a perfect circle when viewed in the axis P direction. The protruding portion 8b is formed in an arc shape along the peripheral edge of the hollow portion 8c. The protruding portion 8b is disposed closer to the axis P than the outer edge of the end face 8a. For example, the protruding portion 8b is disposed at a position continuous with the inner peripheral surface facing the hollow portion 8c of the clamp member 8. The side surface of the protruding portion 8b on the axis P side is smoothly continuous with the inner peripheral surface.

For example, the length dimension of the protruding portion 8b is set to a value that is ½ (half perimeter) of the entire perimeter of the peripheral edge of the hollow portion 8c when viewed in the axis P direction. The height (in the axis P direction) of the protruding portion 8b can be set as appropriate. When the workpiece W is a pair of plate materials W1 and W2, the height dimension of the protruding portion 8b can be set to, for example, a value smaller than the plate thickness dimension of the plate material W1.

At least one of the width dimension and the height dimension of the protruding portion 8b may differ at a plurality of positions on the protruding portion 8b. Further, a cross section of the protruding portion 8b which is perpendicular to the longitudinal direction is not limited to a rectangular shape, and may be, for example, a parabolic shape that is convex toward the workpiece W. Further, the protruding portion 8b may be disposed at a position discontinuous with the inner peripheral surface of the clamp member 8. In other words, a step may be provided between the side surface of the protruding portion 8b which is located on the axis P side and the inner peripheral surface of the clamp member 8.

The device 1 may have, for example, a C-shaped frame structure. In this case, the rotary tool 2, the tool driver 3, the controller 4, and the clamp member 8 may be disposed at the upper part of the device 1, and the backing portion 5 may be disposed at the lower part of the device 1. The device 1 may be attached to, for example, an articulated robot. In addition, in the device 1, the rotary tool 2, the tool driver 3, the controller 4, and the clamp member 8 may be attached to the articulated robot, and the backing portion 5 may be attached to another component (positioner or the like) different from the articulated robot.

Figure 3:
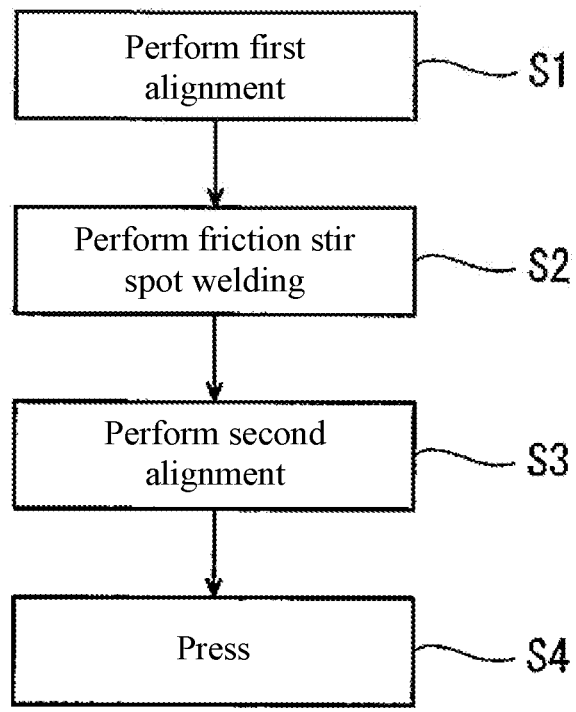
FIG. 3 illustrates a flowchart of a friction stir spot welding method according to the first embodiment.

FIG. 3 illustrates a flowchart of a friction stir spot welding method according to the first embodiment. As shown in FIG. 3, in this method, a sequence including a plurality of steps S1 to S4 in the order mentioned is performed. Specifically, in first alignment step S1, the rotary tool 2 is aligned with the workpiece W in order to perform friction stir spot welding at a predetermined welding position. In welding step S2 after first alignment step S1, the pin member 6 and the shoulder member 7 are pushed into the workpiece W while being rotated at the welding position, and the workpiece W is welded by friction stir spot welding.

In second alignment step S3 after welding step S2 in which the friction stir spot welding is performed on the workpiece W, the pin member 6 and the shoulder member 7 are retracted from the workpiece W and the clamp member 8 is aligned with the workpiece W to press the workpiece W at a predetermined position. In pressing step S4, after second alignment step S3, the protruding portion 8b of the clamp member 8 is caused to press the workpiece W at the predetermined position. Performing this pressing step S4 will apply residual stress to the workpiece W and improve the fatigue strength of the workpiece W.

Figure 4A:
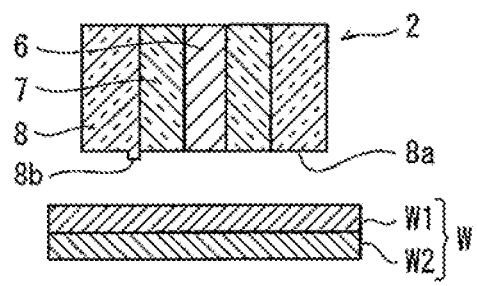
FIGS. 4A-4F illustrate cross-sectional views for explaining the friction stir spot welding method according to the first embodiment.

FIGS. 4A-4F are cross-sectional views for explaining the friction stir spot welding method according to the first embodiment. First, the operator inputs the setting information to the device 1 and makes the backing portion 5 hold the plate materials W1 and W2 in an overlaid state. The controller 4 controls the tool driver 3 so as to move the rotary tool 2 to a predetermined welding position, as illustrated in FIG. 4A. Thus, first alignment step S1 is performed to align the rotary tool 2 with the workpiece W.

Next, the controller 4 controls the tool driver 3 so as to rotate/drive the pin member 6 and the shoulder member 7, and also controls the tool driver 3 so as to cause the shoulder member 7 and the clamp member 8 to come into contact with the surface of the workpiece W. Thereafter, the controller 4 controls the tool driver 3 so as to press the shoulder member 7 against the workpiece W.

This causes the end face 8a to come into surface contact with the surface of the workpiece W and the protruding portion 8b of the clamp member 8 to press the surface of the workpiece W (compress the workpiece W). As a result, a groove-shaped concave portion L is formed in the portion of the workpiece W which is pressed with the protruding portion 8b. Further, the shoulder member 7 is pushed into the workpiece W, and the workpiece W is frictionally stirred, as illustrated in FIG. 4B.

At this time, the controller 4 controls the tool driver 3 to move the end face of the pin member 6 which is located on the side to be pushed into the workpiece W to the opposite side to the pushing direction relative to the end face of the shoulder member 7 which is located on the side to be pushed into the workpiece W. As a result, a plastic flow portion W3 of the workpiece W generated by frictional stirring of the shoulder member 7 enters the hollow portion 7a of the shoulder member 7, as illustrated in FIG. 4B.

Next, in a state in which the end face 8a of the clamp member 8 is in surface contact with the surface of the workpiece W, the controller 4 controls the tool driver 3 to move the end faces of the pin member 6 and the shoulder member 7 which are located on the side to be pushed into the workpiece W toward the surface position of the workpiece W before the pin member 6 and the shoulder member 7 come into contact with the surface of the workpiece W.

Figure 4D:
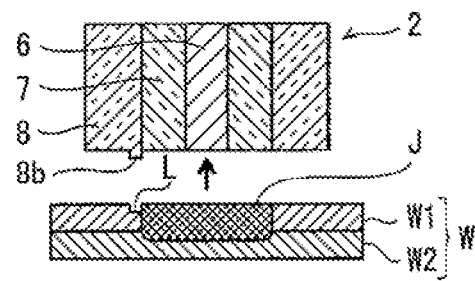
Figure 4B:
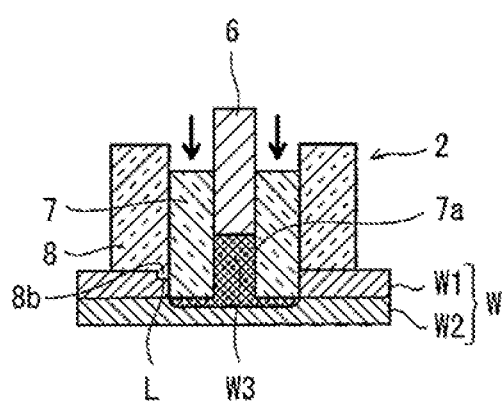
Figure 4E:
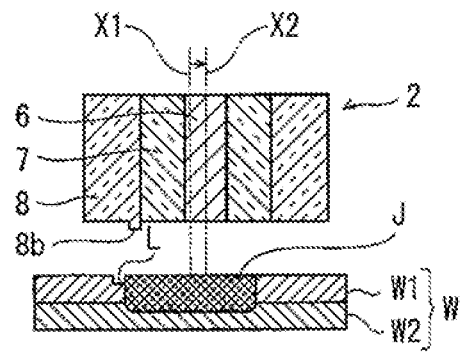
Figure 4C:
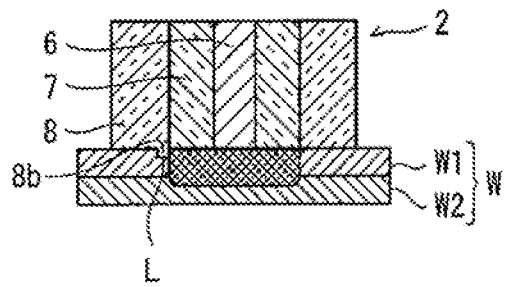

Thus, the workpiece W is subjected to friction stir spot welding while the plastic flow portion W3 of the workpiece W entering the inside of the shoulder member 7 by friction stir by the shoulder member 7 is backfilled by the pin member 6, as illustrated in FIG. 4C.

Figure 5:
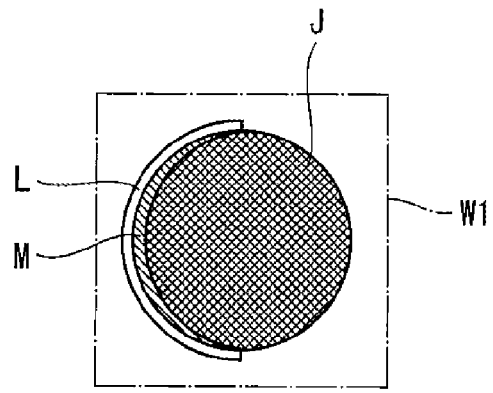
FIG. 5 illustrates a front view of the joint portion of a workpiece formed by the friction stir spot welding method according to the first embodiment.

Welding step S2 is performed as described above to perform friction stir spot welding of the workpiece W and form a circular friction stir region J on the workpiece W as viewed in the axis P direction in a front view, as illustrated in FIG. 5. In welding step S2, the friction stir spot welding is performed in a state in which the protruding portion 8b is positioned at a retraction position different from the pressing position where the protruding portion 8b presses the surface of the workpiece W in pressing step S4.

Next, the controller 4 controls the tool driver 3 so as to separate (retract) the pin member 6, the shoulder member 7, and the clamp member 8 from the workpiece W, as illustrated in FIG. 4D. Thereafter, the controller 4 controls the tool driver 3 so as to align the rotary tool 2 by moving the axis P position of the pin member 6 with respect to the workpiece W along the surface of the workpiece W from a position X1 at the time of friction stir spot welding to a position X2 shifted by a predetermined distance, as illustrated in FIG. 4E. Thus, second alignment step S3 is performed to align the protruding portion 8b with respect to the workpiece W.

The position X2 is set to a position that overlaps the friction stir region J in this embodiment. Further, the position of the protruding portion 8b around the axis P is set such that the center of the protruding portion 8b in the longitudinal direction is located at the peripheral edge of the friction stir region J adjacent to the concave portion L at the position X2 and the protruding portion 8b extends in the circumferential direction of the friction stir region J.

In other words, at the position X2, in order to form a concave portion M (to be described later) by the protruding portion 8b at the peripheral edge of the friction stir region J, the clamp member 8 is set such that the surface of the workpiece W can be pressed in a region where at least a part of the protruding portion 8b does not overlap the concave portion L.

The operation of retracting the pin member 6, the shoulder member 7, and the clamp member 8 from the workpiece W and the alignment operation of the rotary tool 2 in second alignment step S3 may be performed simultaneously.

Next, after welding step S2, while the pin member 6 and the shoulder member 7 are separated from the workpiece W, the surface of at least the friction stir region J formed in welding step S2 or an adjacent region adjacent to the friction stir region J is pressed with the protruding portion 8b of the clamp member 8.

Figure 4F:
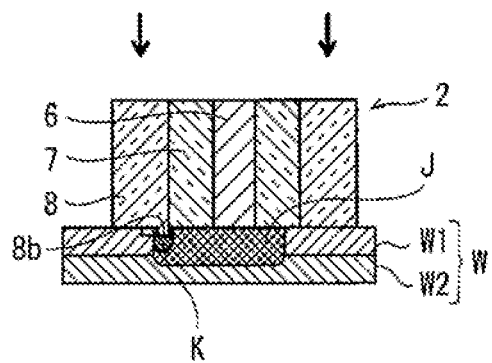

In this embodiment, after second alignment step S3, the controller 4 controls the tool driver 3 so as to cause the protruding portion 8b of the clamp member 8 to press the surface of the friction stir region J of the workpiece W while the axis P position of the pin member 6 with respect to the workpiece W is aligned with the position X2, as illustrated in FIG. 4F.

As described above, pressing step S4 is performed to form a compression portion (compression plastic strain portion) K on the workpiece W and apply a residual stress to the workpiece W. In pressing step S4, the surface of the workpiece W is pressed with the protruding portion 8b with the protruding portion 8b moved from the retraction position to the pressing position. By performing pressing step S4 in a state in which the temperature of the friction stir region J is lower than the friction stir temperature, the workpiece W is cold-compressed. Thereafter, the controller 4 controls the tool driver 3 so as to release the compression by the clamp member 8.

Figure 6:
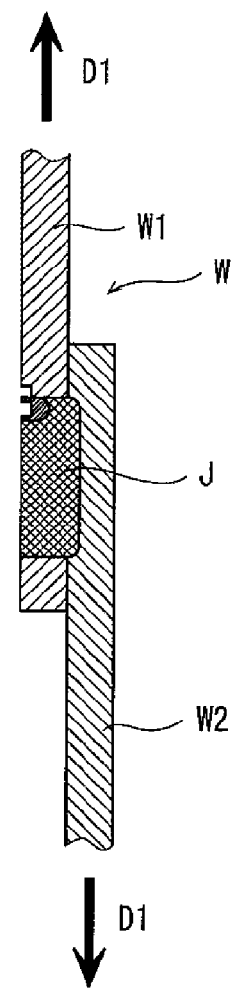
FIG. 6 illustrates a cross-sectional view showing a state when a tensile load is applied from both ends of the workpiece to the joint portion of the workpiece formed by the friction stir spot welding method according to the first embodiment.

FIG. 5 shows a front view of the joint portion of the workpiece W formed by the friction stir spot welding method according to the first embodiment. FIG. 6 shows a cross-sectional view showing a state when a tensile load is applied from both ends of the workpiece W to the joint portion of the workpiece W formed by the friction stir spot welding method according to the first embodiment.

As shown in FIG. 5, the friction stir region J having a circular shape in a front view is formed in the workpiece W after the friction stir spot welding, and the concave portion L is formed throughout the half perimeter of the peripheral edge. In the radial direction of the friction stir region J, a groove-like concave portion M extending in the circumferential direction of the friction stir region J is formed in the peripheral edge adjacent to the concave portion L of the friction stir region J.

The concave portions L and M are both formed by the protruding portions 8b, but the concave portions L and M are integrated with each other in the region where they overlap each other (in this embodiment, both end regions in the longitudinal direction of the concave portions L and M). A compression portion K is formed in a region of the concave portion M which does not overlap the concave portion L. The workpiece W is provided with a residual stress (compressive residual stress) due to the formation of the compression portion K This improves the fatigue strength.

For this reason, for example, as shown in FIG. 6, when a fatigue load repeatedly applies a tensile force D1 to the first plate material W1 and the second plate material W2 of the workpiece W in the direction in which each of the plate materials W1 and W2 extends and the boundary (welding boundary) of the friction stir region J becomes a starting point and a propagation path of fatigue fracture, the fatigue life of the workpiece W is extended by virtue of the residual stress applied to the compression portion K.

Note that the length of the compression portion K may be shorter than the entire perimeter of the friction stir region J. The length of the compression portion K may be set as appropriate according to the strength required for the joint portion of the workpiece W, the load level to be applied, and the combined load. According to the study by the present inventors, the length of the compression portion K may be, for example, a value in a range of ½ or less of the entire perimeter of the friction stir region J when a uniaxial tensile load shown in FIG. 6 is applied. Further, the compression portions K may be formed at a plurality of positions in one friction stir region J. The plurality of compression portions K may be arranged in the radial direction of the friction stir region J, or may be arranged in the circumferential direction of the friction stir region J in a front view.

As described above, in the clamp member 8 of the first embodiment, the protruding portion 8b of the clamp member 8 protrudes from the end face 8a of the clamp member 8 in the axis P direction, extends around the axis P, and can presses the workpiece W. Accordingly, after the workpiece W is pressed with the clamp member 8 and the workpiece W is welded by friction stir welding using the pin member 6 and the shoulder member 7 of the rotary tool 2, the friction stir region J of the workpiece W or the adjacent region adjacent to the friction stir region can be pressed with the protruding portion 8b of the clamp member 8. As a result, the workpiece W can be compressed, and a residual stress can be applied to the joint portion of the workpiece W. Accordingly, the fatigue strength of the joint portion of the workpiece W can be improved.

Further, such pressing of the workpiece W (pressing of the workpiece W in pressing step S4) can be performed using the clamp member 8. In addition, when friction stir spot welding is performed a plurality of times by a series of welding operations, such pressing operation can be performed between the respective welding operations. Therefore, it is possible to efficiently perform the friction stir spot welding and pressing of the workpiece W by a series of operations and to suppress a decrease in productivity of welded bodies due to the addition of pressing step (process) S4.

In addition, by pressing the workpiece W by the protruding portion 8b that protrudes from the end face 8a of the clamp member 8 in the axis P direction and extends around the axis P, the pressing area can be reduced. Accordingly, it is possible to properly compress the workpiece W even by a relatively small pressing force. In other words, the compressive plastic strain necessary for the workpiece W can be imparted by the protruding portion 8b within the load output range required for welding step of the conventional friction stir spot welding device. For this reason, it is not necessary to prepare a dedicated device for pressing the workpiece W. Therefore, the cost and work load for improving the fatigue strength of the joint portion can be reduced, and the fatigue strength of the joint portion can be improved efficiently.

When viewed in the axis P direction, because the end face 8a is formed in an annular shape and the protruding portion 8b is formed in an arc shape, the protruding portion 8b can impart sufficient compressive plastic strain to the workpiece W in a wide region extending in the circumferential direction of the end face 8a. This further improves the fatigue strength of the workplace.

Further, because the protruding portion 8b is disposed on the axis P side with respect to the outer edge of the end face 8a, the amount of movement of the clamp member 8 relative to the workpiece W is reduced when compressive plastic strain is applied to the peripheral edge of the friction stir region J. This makes it possible to easily apply compression plastic strain efficiently.

Further, by having the clamp member 8, the device 1 can reduce the cost and work load necessary for improving the fatigue strength of the joint portion. Therefore, the fatigue strength of the joint portion can be efficiently improved by the device 1.

In welding step S2, friction stir spot welding is performed while the protruding portion 8b is positioned at a retraction position different from the pressing position where the protruding portion 8b presses the surface of the workpiece W in pressing step S4. In pressing step S4, the surface of the workpiece W is pressed with the protruding portion 8b moved from the retraction position to the pressing position. Thereby, the surface of the workpiece W can be favorably pressed in pressing step S4 at a position different from the position where the protruding portion 8b presses in welding step S2. For this reason, residual stress can be applied to a wide range of the joint portion of the workpiece W without restriction due to the pressing portion (concave portion L) formed on the surface of the workpiece W in welding step S2.

Note that the concave portion M may be formed in the surface of the friction stir region J by forming the protruding portion 8b in an arc shape with a curvature larger than the curvature of the peripheral edge of the friction stir region J when viewed in the axis P direction. This makes it possible to easily form the compression portion K inside the peripheral edge of the friction stir region J. The second embodiment will be described, focusing on differences from the first embodiment.

Second Embodiment

Figure 7A:
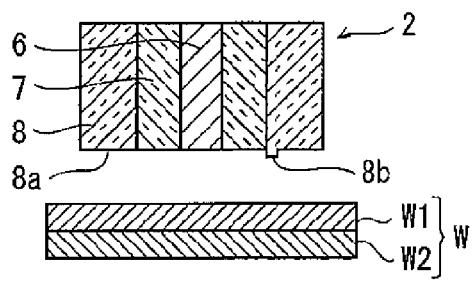
FIGS. 7A-7F illustrate cross-sectional views for explaining the friction stir spot welding method according to a second embodiment.
Figure 7D:
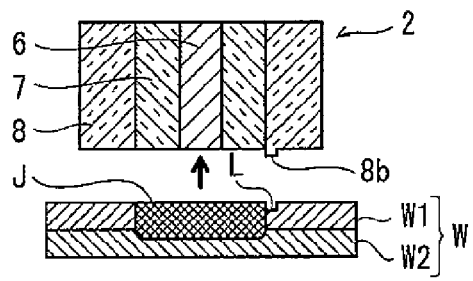
Figure 7B:
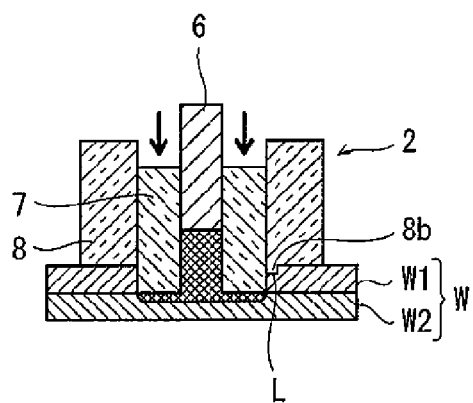
Figure 7E:
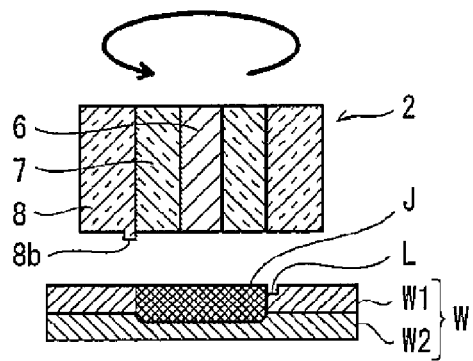
Figure 7C:
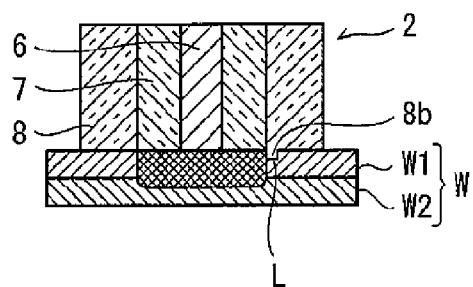
Figure 7F:
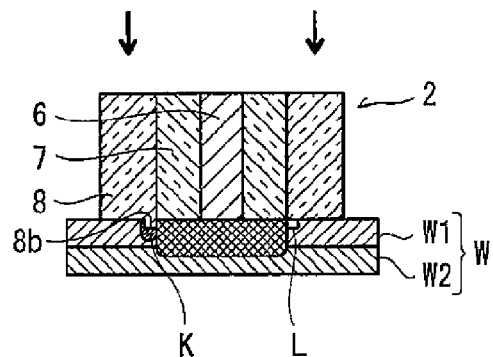
Figure 8:
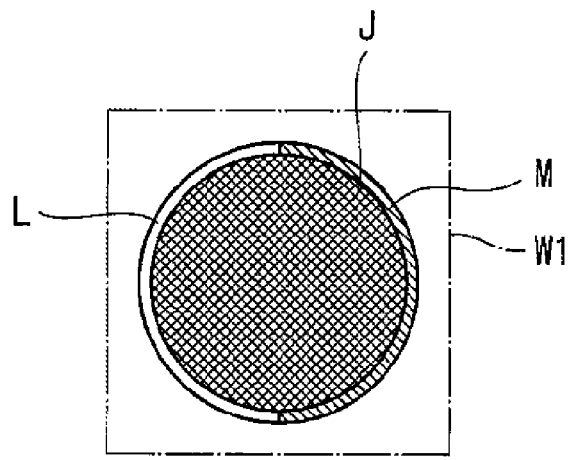
FIG. 8 illustrates a front view of the joint portion of a workpiece formed by the friction stir spot welding method according to the second embodiment.

FIGS. 7A-7F illustrate cross-sectional views for explaining the friction stir spot welding method according to the second embodiment. FIG. 8 shows a front view of the joint portion of the workpiece W formed by the friction stir spot welding method according to the second embodiment.

As a difference from the first embodiment, a clamp member 8 is provided for a tool driver 3 so as to be rotatable around an axis P. After first alignment step S1 and welding step S2 are performed as illustrated in FIGS. 7A-7D, a controller 4 controls the tool driver 3 so as to rotate the clamp member 8 around the axis P through a predetermined angle (180° in this case) while maintaining the axis P position of the pin member 6 relative to a workpiece W when the friction stir spot welding has been performed as illustrated in FIG. 7E. With this operation, second alignment step S3 is performed. In this manner, pressing step S4 is performed in a state in which the clamp member 8 is aligned with respect to the workpiece W, as illustrated in FIG. 7F.

As a result, as shown in FIG. 8, in the workpiece W, a concave portion M is formed in a region adjacent to a friction stir region J and not overlapping a concave portion L. In this embodiment, the entire circumference of the friction stir region J is surrounded by the concave portions L and M in a front view. Of the entire circumference of the friction stir region J, the peripheral edge of the half circumference is surrounded by the concave portion L, and the peripheral edge of the remaining half circumference is surrounded by the concave portion M. In the second embodiment, the compression portion K can be formed on the workpiece W without restriction due to the position of the concave portion L formed in welding step S2. That is, in the second embodiment, the compression portion K can be formed corresponding to the entire region of the concave portion M, and the residual stress can be applied to a relatively wide region of the workpiece W.

Modification

Figure 9:
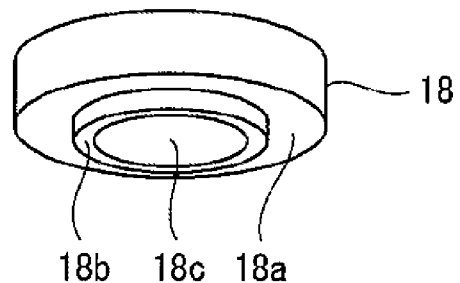
FIG. 9 illustrates a perspective view of a clamp member according to Modification 1 as viewed from the end face side.

FIG. 9 shows a perspective view of a clamp member 18 according to Modification 1 as viewed from an end face 18a side. When viewed in the axis P direction, the clamp member 18 has an end face 18a formed in an annular shape, and a protruding portion 18b formed in an annular shape extending over the entire circumference of the end face 18a. In other words, when viewed in the axis P direction, the peripheral edge of a hollow portion 18c of the clamp member 18 is surrounded by the protruding portion 18b.

By using the clamp member 18 described above, compressive plastic strain can be imparted to the workpiece W by the protruding portion 8b in a wide region extending over the entire circumference of the end face 8a. Accordingly, the fatigue strength of the workpiece W can be further improved. In Modification 1, the annular concave portions L and M are formed in the workpiece W at positions shifted from each other while partially overlapping in a front view.

Figure 10:
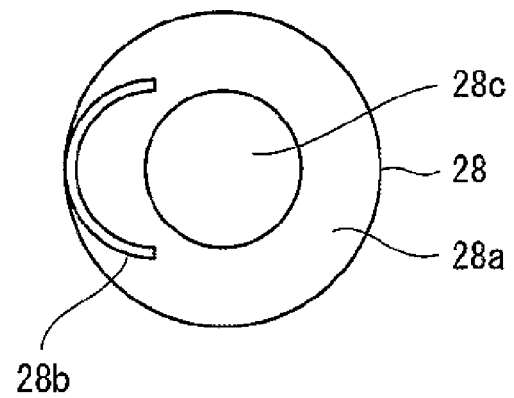
FIG. 10 illustrates a front view of a clamp member according to Modification 2.

FIG. 10 shows a front view of a clamp member 28 according to Modification 2. The clamp member 28 has the same basic structure as that of the clamp member 8 according to the first embodiment. However, when viewed in the axis P direction, a protruding portion 28b of the clamp member 28 is formed at a position closer to a radially outer end face 28a of the clamp member 28 than the peripheral edge of a hollow portion 28c. Further, the side surface of the protruding portion 28b which is located on the hollow portion 28c side is set to have the same curvature as that of the inner peripheral surface of the hollow portion 28c when viewed in the axis P direction.

For example, in Modification 2, in a plane including the end face 28a and parallel to the end face 28a, both ends of the protruding portion 28b in the longitudinal direction as viewed in a direction perpendicular to a direction passing through the center of the protruding portion 28b in the longitudinal direction and the axis P are arranged at positions separated from the hollow portion 28c.

By using the clamp member 28 described above, in pressing step S4, residual stress can be easily applied to the workpiece W by forming the compression portion K on the peripheral edge of the friction stir region J of the workpiece W without restriction due to the position of the concave portion L formed in the workpiece W in welding step S2. Accordingly, the fatigue strength of the workpiece W can be more favorably improved.

The present application is not limited to the above-described embodiments and modifications, and the configuration or method thereof can be changed, added, or deleted without departing from the spirit of the present application. Obviously, the workpiece W is not limited to the pair of plate materials W1, W2. The workpiece W may be a component of a vehicle such as an aircraft, an automobile, or a railway vehicle, or may be a component of a building.

In pressing step S4, when the surface of an adjacent region adjacent to the friction stir region J of the workpiece W is pressed with the protruding portion 8b, 18b, or 28b, the compression portion K may be formed to extend in the circumferential direction of the friction stir region J. In addition, the compression portion K may be formed astride both the friction stir region J and the adjacent region. This makes it possible to form the compression portion K at the interface between the friction stir region J and the adjacent region.

Each of the above-described embodiments has exemplified the arrangement configured to drive the pin member 6, the shoulder member 7, and the clamp member 8, 18, or 28 by using the single tool driver 3. However, one or two of these members may be driven by another driver, or each member may be driven by an individual driver.

The present application can efficiently improve the fatigue strength of the joint portion of a workpiece formed by double-acting friction stir spot welding, and hence can be used widely in various fields using double-acting friction stir spot welding.

The foregoing explanation should be interpreted only as various examples for teaching best modes for carrying out the present application to one skilled in the art. The structures and/or functional details may be substantially modified within the scope of the present application.

REFERENCE SIGNS LIST

J friction stir region
P axis
W workpiece
W3 plastic flow portion
1 double-acting friction stir spot welding device
2 rotary tool
6 pin member
7 shoulder member
8, 18, 28 clamp member
8a, 18a, 28a end face
8b, 18b, 28b protruding portion

The invention claimed is:

1. A clamp for a double-acting friction stir spot welding device that performs friction stir spot welding of a workpiece, the double-acting friction stir spot welding device including a rotary tool and presses a surface of the workpiece awhile the workpiece is supported, the rotary tool including a pin that rotates around an axis and advances and retracts in an axial direction and a shoulder that rotates around the axis while surrounding an outer periphery of the pin and advances and retracts in the axial direction independently of the pin, the clamp comprising:
an end face that comes into surface contact with the surface of the workpiece to press the surface; and
a protruding portion protruding from the end face in the axial direction and extending around the axis, the protruding portion pressing the workpiece, wherein
the clamp surrounds an outer periphery of the shoulder, and
the protruding portion is disposed closer to the axis than to an outer edge of the end face.

2. The clamp according to claim 1, wherein
the end face is formed in an annular shape, and
the protruding portion is formed in an arc shape extending in a circumferential direction of the end face when viewed in the axial direction.

3. The clamp according to claim 1, wherein
the end face is formed in an annular shape, and
the protruding portion is formed in an annular shape extending over an entire circumference of the end face when viewed in the axial direction.

4. A double-acting friction stir spot welding device, comprising:
the clamp of claim 1; and
the rotary tool.

5. A friction stir spot welding method for performing friction stir spot welding of a workpiece by using a rotary tool for friction stir spot welding of the workpiece and a clamp for pressing a surface of the workpiece while the workpiece is supported, wherein
the rotary tool includes a pin that rotates around an axis and advances and retracts in an axial direction, and a shoulder that rotates around the axis while surrounding an outer periphery of the pin and advances and retracts in the axial direction independently of the pin,
the clamp includes an end face that comes into surface contact with the surface of the workpiece to press the surface and a protruding portion protruding from the end face in the axial direction and extending around the axis, the protruding portion pressing the workpiece, and
the clamp surrounds an outer periphery of the shoulder, the friction stir spot welding method comprising:

a welding step of performing friction stir spot welding of the workpiece while causing the pin to backfill a plastic flow portion of the workpiece entering an inside of the shoulder by friction stir using the shoulder in a state in which the surface of the workpiece is pressed with the clamp; and a pressing step of causing the protruding portion of the clamp to press a surface of at least one of a friction stir region of the workpiece and an adjacent region adjacent to the friction stir region of the workpiece after the welding step in a state in which the pin and the shoulder are separated from the workpiece.

6. The friction stir spot welding method according to claim 5, wherein in the welding step, the friction stir spot welding is performed in a state in which the protruding portion is positioned at a retraction position different from a pressing position where the protruding portion presses the surface of the workpiece in the pressing step, and in the pressing step, the surface of the workpiece is pressed with the protruding portion with the protruding portion moved from the retraction position to the pressing position.

7. The friction stir spot welding method according to claim 5, further comprising a first aligning step performed prior to the welding step, the first aligning step including aligning the rotary tool with respect to the workpiece.

8. The friction stir spot welding method according to claim 7, further comprising a second aligning step performed after the welding step and before the pressing step, the second aligning step including re-aligning the clamp with respect to the workpiece.

9. A double-acting friction stir spot welding device that performs friction stir spot welding of a workpiece, the double-acting friction stir spot welding device comprising:

a rotary tool that includes
  a pin that rotates around a predetermined axis and advance and retract in an axial direction, and
  a shoulder that rotates around the axis while surrounding an outer periphery of the pin and advance and retract in the axial direction independently of the pin;

a clamp that includes
  an end face that comes into surface contact with the surface of the workpiece to press the surface; and
  a protruding portion protruding from the end face in the axial direction and extending around the axis, the protruding portion pressing the workpiece, wherein the clamp surrounds an outer periphery of the shoulder, and the protruding portion is disposed closer to the axis than to an outer edge of the end face.

10. The double-acting friction stir spot welding device according to claim 9, further comprising:

a tool driver; and processing circuitry configured to control the tool driver to perform friction stir spot welding of the workpiece while causing the pin to backfill a plastic flow portion of the workpiece entering an inside of the shoulder by friction stir using the shoulder in a state in which the surface of the workpiece is pressed with the clamp; and causing the protruding portion of the clamp to press a surface of at least one of a stir region of the workpiece and an adjacent region adjacent to the friction stir region of the workpiece after the friction stir spot welding in a state in which the pin and the shoulder are separated from the workpiece.

11. The double-acting friction stir spot welding device according to claim 10, wherein the processing circuitry is further configured to control the tool driver to, prior to the friction stir spot welding, align the rotary tool with respect to the workpiece.

12. The double-acting friction stir spot welding device according to claim 11, wherein the processing circuitry is further configured to control the tool driver to, after the friction stir spot welding and prior to the pressing the surface of the at least one of the region, re-align the clamp with respect to the workpiece.

13. The double-acting friction stir spot welding device according to claim 9, wherein the end face is formed in an annular shape, and the protruding portion is formed in an arc shape extending in a circumferential direction of the end face when viewed in the axial direction.

14. The double-acting friction stir spot welding device according to claim 9, wherein the end face is formed in an annular shape, and the protruding portion is formed in an annular shape extending over an entire circumference of the end face when viewed in the axial direction.

\* \* \* \* \*